Figure 1:
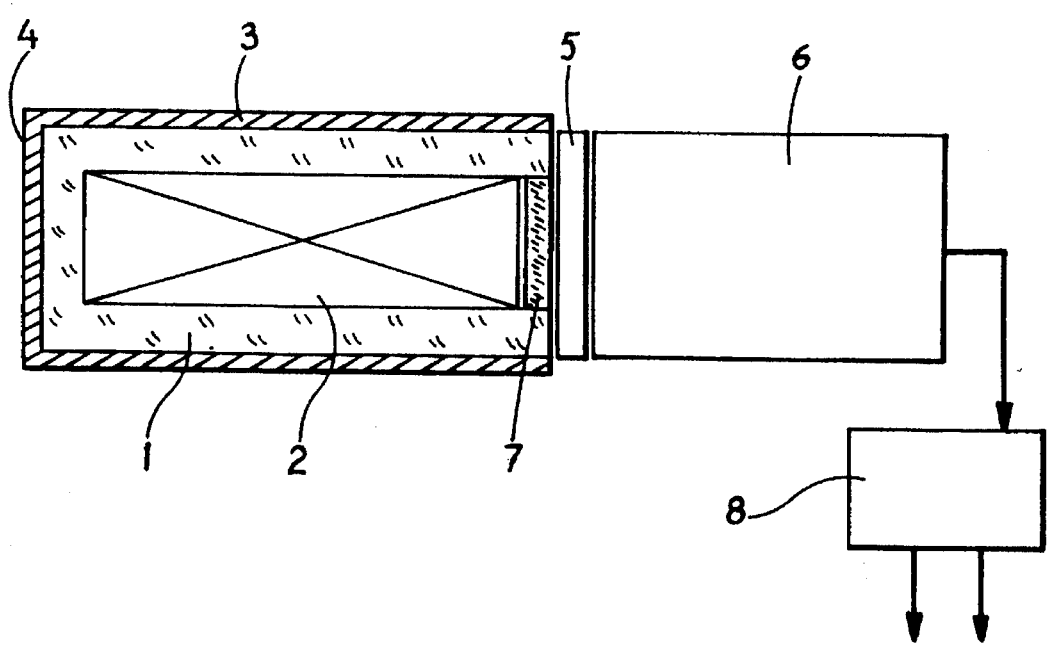

United States Patent [19]

Daniel et al.

[11] Patent Number: 5,481,114

[45] Date of Patent: Jan. 2, 1996

[54] PROCESS AND APPARATUS FOR THE SIMULTANEOUS SELECTIVE DETECTION OF NEUTRONS AND X OR GAMMA PHOTONS

[75] Inventors: Georges Daniel, Palaiseau; Edouard Marienbach, Fontainebleau; Jean-Louis Szabo, Bagnolet, all of France

[73] Assignee: Commissariat a l'Energie Atomique, France

[21] Appl. No.: 178,284

[22] PCT Filed: Jul. 7, 1992

[86] PCT No.: PCT/FR92/00647

§ 371 Date: May 9, 1994

§ 102(e) Date: May 9, 1994

[87] PCT Pub. No.: WO93/01507

PCT Pub. Date: Jan. 21, 1993

[30] Foreign Application Priority Data

Jul. 8, 1991 [FR] France ................... 91 08542

[51] Int. Cl.⁶ .................. G01T 1/20; G01T 3/00; G01T 3/06
[52] U.S. Cl. .................. 250/390.11; 250/370.11

[58] Field of Search .................. 250/390.11, 390.01, 250/390.07, 370.05, 370.11

[56] References Cited

U.S. PATENT DOCUMENTS

| H,590 | 2/1989 | Chiles et al. . | |
|---|---|---|---|
| 2,994,769 | 4/1961 | Sun et al. | 250/390.11 |
| 3,566,118 | 2/1971 | Peters | 250/83.1 |
| 3,988,586 | 10/1976 | Stuart et al. . | |
| 4,829,185 | 5/1989 | Cerff . | |

FOREIGN PATENT DOCUMENTS 0311503  4/1989  European Pat. Off. .......... 250/370.11

Primary Examiner—Davis L. Willis
Assistant Examiner—Richard Hanig
Attorney, Agent, or Firm—Hayes, Soloway, Hennessey, Grossman & Hage

[57] ABSTRACT

The simultaneous selective detection of neutrons and X or gamma photons is disclosed, employing two scintillators. One scintillator uses a first doped scintillation detector that is sensitive to neutrons, while the second doped scintillation device is sensitive to X or gamma photons whereby the scintillations occurring at the two devices are in distinct and separate energy bands.

6 Claims, 1 Drawing Sheet

PROCESS AND APPARATUS FOR THE SIMULTANEOUS SELECTIVE DETECTION OF NEUTRONS AND X OR GAMMA PHOTONS

The invention relates to the simultaneous and selective detection of flows of neutrons and gamma or X photons, more particularly for nuclear diagraphy and measurements of specific burn-ups on irradiated fuel assemblies.

The detection of neutrons in the presence of a large gamma photon flow has always proved difficult. One of the processes used in the prior art consists of using detectors such as $^{10}BF_3$, $^3He$ proportional counters, intrinsically disturbed by high X or gamma dose rates, whilst surrounding them with a shielding effective with respect to said radiation. Another process consists of using fission chambers insensitive to said radiation, but which have a limited efficiency for neutrons.

It is often necessary to simultaneously detect the emissions of neutrons and X or gamma photons from a radiation source. This is generally accomplished in the prior art by using two detectors, one for the neutrons and the other for the X or gamma photons.

The prior art in this field can e.g. be illustrated by FR-A-2 317 668 or DE-A-1 564 271. Both these documents refer to an apparatus using two detectors, one for the neutrons and the other for the photons, both producing visible photons by scintillation, said two detectors being combined with the sane photomultiplier. The problem of this selective detection consequently consists of using means making it possible, from among the scintillations taken into account by the photomultiplier, to obtain a selection of those which are due to the neutrons and those which are due to the X or gamma photons. In the prior art, the selection of scintillations respectively relative to these two radiation categories is performed at the output of the scintillator by a processing of the signal using special, distinctive characteristics of said sane scintillations as a function of whether they are due to neutrons or photons. Essentially this discrimination either takes place on the pulse rise time (FR-A-2 317 668), or on differences of the decay time of the pulses emitted by the two scintillators (DE-A-1 564 271). In both cases, this signal processing phase leads to expensive, complex spectrometric electronics.

Another document "United States Statutory Invention Registration" No. H590 describes a scintillation detector sensitive both to neutrons and gamma rays as a result of the presence of two scintillators, namely an external scintillator for the thermal neutrons and an internal scintillator for the fast neutrons and gamma photons. However, in the above prior art, discrimination takes place in the electronic output systems by shape measurements with respect to the pulses and the counting of the latter one by one after selection using complex and costly equipment. Therefore, in said detector, the scintillator sensitive to the gamma photons is a plastic scintillator which, by its very nature, is unable to supply photoelectric peaks usable in spectrometry.

The present invention relates to a process and an apparatus for the simultaneous selective detection of neutrons and X or gamma photons making it possible with the aid of means which can be simply realized, to completely separate the two scintillation types using a single energy channel spectrometric measuring system, each of the channels corresponding to one of the two scintillation types to be separated.

The process for the simultaneous selective detection of neutrons and X or gamma photons with the aid of a detector having two scintillators, one sensitive to neutrons and the other sensitive to X or gamma photons, and combined with a photomultiplier-type apparatus, is characterized in that the physical characteristics of the two scintillators and/or a possible wavelength converter positioned between the scintillators and the photomultipler apparatus are chosen in such a way that the peak of the scintillations due to the neutrons and the photoelectric peak due to the X or gamma photons are located in wavelength bands which are clearly separated beth from one another and from the electronic background of the apparatus.

As can be seen, the invention therefore essentially relates to the stage of the process relating to the means for separating into two clearly separate wavelength bands of scintillations relative to each of the two studied radiation types. Thus, the applicant has revealed that by a careful choice of the scintillator materials and/or the use of a possible wavelength converter, that it was possible to precisely locate in two energy bands clearly separated from one another and from the background noise, the scintillations due to the photons and the scintillations due to the neutrons.

In particular, the scintillator sensitive to the photons must be inorganic and monocrystalline, because it must be able to supply a photoelectric peak usable with a spectrometric chain or system, as will be indicated hereinafter in greater detail.

As a function of the particular case, this separation of the peak of the scintillations due to the neutrons and the photoelectric peak due to the photons can easily be obtained by the choice of scintillators present. In other cases, it is necessary to use a wavelength converter. In the latter hypothesis, the wavelength converter is tuned to the medium wavelength band of the light scintillations of the scintillator sensitive to the photons in order to convert it into a similar band in a wavelength range clearly separated from the emission band of the scintillator sensitive to the neutrons and the electronic background noise of the apparatus.

The considerable advantage resulting from the realization of the process according to the invention is due to the fact that the two scintillation channels are identified and clearly separated, so that the electronic measuring system can be greatly simplified and reduced to a dual channel spectrometer constituted by inexpensive, standard electronic equipment.

The invention also relates to an apparatus for the simultaneous selective detection of neutrons and X or gamma photons, characterized in that it incorporates a detector having a-monocrystalline, inorganic scintillator sensitive to the gamma or X photons located in an external $^6Li$ doped glass sleeve serving as a scintillator sensitive to the neutrons and providing a protection against said neutrons, from the X or gamma scintillator, a light reflector of limited thickness transparent to the neutrons and to the X or gamma photons, covering the $^6Li$ doped glass scintillator and whose reflecting surface is turned towards the latter, an optical confinement enclosure covering the light reflector and ensuring the sealing of the assembly of the detector with respect to the exterior, a photomultipler means located at the output of the two scintillators and associated with the latter across an optical coupler and a dual channel spectrometric measuring system located at the output of the photomultiplier means and separately performing in each channel the counting respectively of the scintillations due to the neutrons and the scintillations due to the X or gamma photons.

According to another important feature of the invention, the monocrystalline, inorganic, gamma or X photon scintillator uses a scintillating material chosen from within the group including bismuth germanate (BGO), cesium iodide (CsI), cesium fluoride (CsF), sodium iodide (NaI) and gadolinium orthosilicate (GSO).

According to the invention, the thermal neutrons are detected by means of the reaction (n, alpha) of the lithium 6. The alpha particle and the triton from the reaction are emitted in opposite directions with energies of 2.05 and 2.74 MeV respectively. Due to the fact that the free average path of the thermal neutrons is generally approximately one millimeter for glass, it is possible to obtain very high neutron detection efficiencies with relatively small glass thicknesses. There is also a very good protection of the X or gamma scintillator as a result of the absence of gamma capture photons in the neutron/lithium 6 interaction.

The X or gamma photons are detected by means of a scintillator as described hereinbefore, whose dimensions are calculated as a function of the energies of the incident gamma or X photons and the absorption mass coefficients of the scintillator in order to obtain the best possible efficiency.

It is important to note that the lithium 6-doped glass sleeve serving as the scintillator for the detection of the thermal neutrons has a double function in that it also protects the internal X or gamma photon scintillator against the neutrons.

According to an optional, but sometimes important feature of the invention, the detection apparatus has between the scintillators and the optical coupler a wavelength converter tuned to the band of the scintillations due to the X or gamma photons and transferring said band into a range of wavelengths clearly separate from the band of the scintillations due to the neutrons, as well as the background noise, thus creating the two separate channels in which the spectrometric measuring system functions.

As has already been explained, this means according to the invention is optional and use is made thereof in order to ensure a good separation of the reading channels with respect to one another and with respect to the background noise, only in the case where said separation is not obtained in a satisfactory manner by the appropriate choice of the scintillating materials and the physical characteristics of the two scintillators.

Finally, according to the invention, the photomultiplier means can either be a photomultiplier in the conventional sense of the word, or a photodiode.

Figure 2:
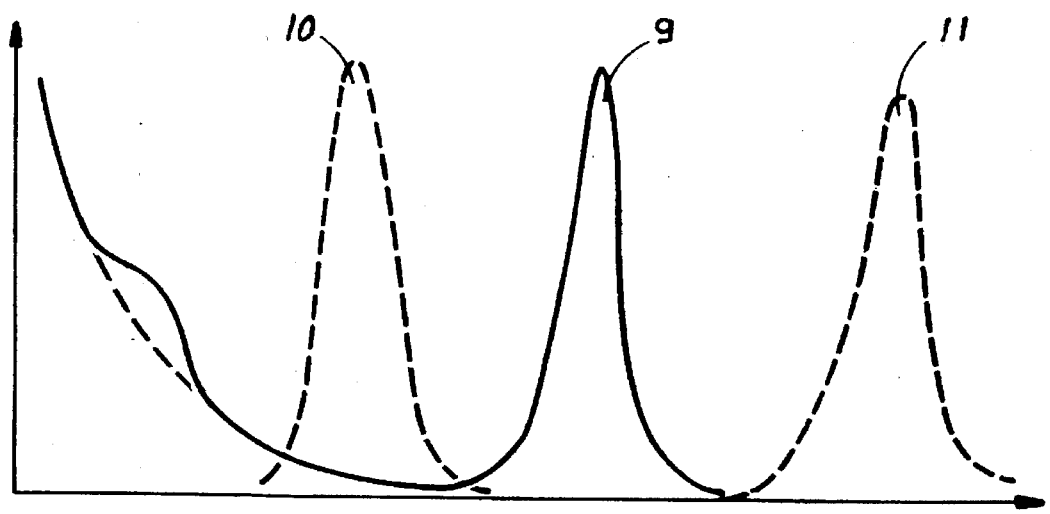

The invention is described in greater detail herein relative to a non-limitative embodiment and with reference to attached FIGS. 1 and 2, wherein show:

FIG. 1 A sectional diagram along the axis of the detection apparatus according to the invention.

FIG. 2 The amplitude spectrum of the scintillations due to the neutrons and the gamma photons showing the respective arrangement of the different peaks.

At 1 in FIG. 1 it is possible to see the first lithium 6-doped glass scintillator substantially occupying the shape of a sleeve and within which is located the second scintillator 2 which is used for the detection of the X or gamma photons. As has already been stated, this particular arrangement makes it possible to protect the scintillator 2 against neutrons coming from the outside. The assembly of the two scintillators 1 and 2 is enclosed in a reflecting envelope 3, whereof the reflecting portion is turned towards the scintillators 1 and 2, so as to avoid any light energy loss by leakage towards the outside. The reflecting envelope 3 is in turn enclosed in a mechanical and optical confinement enclosure 4, which seals the assembly with respect to the exterior.

FIG. 1 also shows an optical coupler 5 ensuring the good transmission of the light scintillations to the photomultiplier 6.

In the embodiment according to FIG. 1, the detection apparatus is completed by a wavelength converter 7 which, as stated hereinbefore, makes it possible to distribute the scintillation peaks in energy channels provided beforehand and as will be explained in connection with FIG. 2.

Finally, at the output of the photomultipler 6 there is a dual channel spectrometric measuring system 8 preset once and for all on the two wavelengths or energy bands in which the apparatus restores the scintillation counting informations.

Obviously, the nested arrangement of the two scintillators 1 and 2 respectively sensitive to neutrons and X and gamma photons implies that the material from which the scintillator 2 is formed can also serve as a light guide for the transmission of the light informations coming from the scintillations in the scintillator 1.

FIG. 2 shows the amplitude spectra of the scintillations due to the neutrons (in continuous line form) and to the X and gamma photons (in dotted line form). The number of counted pulses is shown on the ordinate and the energy on the abscissa.

The spectrum due to the neutrons has a peak 9 which it is not aimed to modify. However, by an appropriate choice of the scintillating materials on the one hand and/or, if appropriate, a wavelength converter on the other, it is possible to ensure that the photoelectric peak of the scintillations due to the X or gamma photons is located either in 10 or 11, i.e. in an energy or wavelength channel clearly differentiated from that of the peak due to the neutrons. It is then clear that it is sufficient to have a dual channel spectrometric system for carrying out the counting of the number of scintillations due to each radiation type. Moreover, this can be carried out by standard equipment preset once and for all and much simpler and less expensive than the signal processing means used in the prior art for making the selection between the two origins of simultaneous scintillations.

A detection apparatus according to the invention has a large number of possible applications such as e.g. simultaneous measurements which involve interactions with the material, neutrons and photons in the industrial, geological and mining fields (density/humidity, weight/humidity and thickness/humidity gauges, as well as neutron and/or gamma diagraphs), the monitoring of the movements of irradiated fuel assemblies in reprocessing plants, the measurement of the specific burn-up of irradiated assemblies and in general terms any measurement in which neutrons and photons are associated with a need for separate counting.

We claim:

1. A process for the simultaneous selective detection of neutrons and X or gamma photons using a detector having two scintillators, one sensitive to the neutrons and the other sensitive to the X or gamma photons, combined with a photomultiplier-type apparatus (6), comprising: (a) providing a scintillator sensitive to the X or gamma photons which is of an organic, monocrystalline nature, and (b) utilizing as distinguishing characteristics of the two scintillators (1,2) and a wavelength converter (7) placed between the scintillators and the photomultiplier apparatus scintillations due to the neutrons and the photoelectric peak of the scintillations due to the x or gamma photons which are in energy bands which are clearly separated from one another and from the electronic background noise of the said apparatus.

2. A process according to claim 1 wherein the wavelength converter (7) is tuned to the medium wavelength range of the light scintillations of the scintillator sensitive to the photons in order to convert it into a similar energy band in a wavelength range clearly separated from the emission band of the scintillator sensitive to the neutrons and the electronic background noise of the apparatus.

3. Apparatus for the simultaneous selective detection of neutrons and X or gamma photons, characterized by comprising a detector having a monocrystalline, inorganic scintillator sensitive to the gamma or X photons (2) located in an external $^6$Li doped glass sleeve serving as the scintillator (1) sensitive to the neutrons, said glass sleeve scintillator being of sufficient thickness to prevent neutrons from passing through and providing a protection against said neutrons from the X or gamma scintillator, a light reflector (3) of limited thickness transparent to the neutrons and to the X or gamma photons, covering the $^6$Li doped glass scintillator and whose reflecting surface is turned towards the latter, an optical confinement enclosure (4) covering the light reflector and ensuring the sealing of the assembly of the detector with respect to the exterior, a photomultiplier means (6) located at the output of the two scintillators (1,2) and associated with the latter across an optical coupler (5) and a dual channel spectrometric measuring system (8) located at the output of the photomultiplier means (6) and separately forming in each channel the counting respectively of the scintillations due to the neutrons and the scintillations due to the X or gamma photons.

4. Detection apparatus according to claim 3, characterized in that the X or gamma photon scintillator uses a scintillating material chosen from within the group including bismuth germanate (BGO), cesium iodide (CsI), cesium fluoride (CsF), sodium iodide (NaI) and gadolinium orthosilicate (GSO).

5. Detection apparatus according to claim 3, characterized by the presence, between the scintillators and the optical coupler, of a wavelength converter (7) tuned to the band of the scintillations due to the X or gamma photons and transferring said band into a wavelength range clearly separate from the band of the scintillations due to the neutrons, as well as the background noise, thus creating two separate channels in which the spectrometric measuring system operates.

6. Detection apparatus according to claim 3, characterized in that the photomultiplier apparatus is a photodiode.

* * * * *

UNITED STATES PATENT AND TRADEMARK OFFICE
CERTIFICATE OF CORRECTION

PATENT NO. : 5,481,114
DATED : January 2, 1996
INVENTOR(S) : Daniel et al

It is certified that error appears in the above-indentified patent and that said Letters Patent is hereby corrected as shown below:

Claim 1, Col. 4, line 62, "x" should be --X--.

Signed and Sealed this

Fourteenth Day of May, 1996

Attest:

BRUCE LEHMAN

*Attesting Officer*     *Commissioner of Patents and Trademarks*